United States Patent
Moon et al.

(10) Patent No.: US 12,254,241 B2
(45) Date of Patent: Mar. 18, 2025

(54) METHOD FOR PREVENTING DUPLICATE APPLICATION OF AUDIO EFFECTS TO AUDIO DATA AND ELECTRONIC DEVICE SUPPORTING THE SAME

(71) Applicant: SAMSUNG ELECTRONICS CO., LTD., Suwon-si (KR)

(72) Inventors: Jungwon Moon, Suwon-si (KR); Seonghwan Kim, Suwon-si (KR); Jongwook Lim, Suwon-si (KR); Misun Kim, Suwon-si (KR); Byeongnam Kim, Suwon-si (KR); Hyunjoong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 18/088,211

(22) Filed: Dec. 23, 2022

(65) Prior Publication Data

US 2023/0132125 A1 Apr. 27, 2023

Related U.S. Application Data

(63) Continuation of application No. PCT/KR2022/009312, filed on Jun. 29, 2022.

(30) Foreign Application Priority Data

Jun. 30, 2021 (KR) .......................... 10-2021-0085750

(51) Int. Cl.
*G06F 3/16* (2006.01)
*G10L 19/16* (2013.01)

(52) U.S. Cl.
CPC .............. *G06F 3/165* (2013.01); *G06F 3/162* (2013.01); *G10L 19/167* (2013.01)

(58) Field of Classification Search
CPC .......... G06F 3/165; G06F 3/162; G10L 19/167
See application file for complete search history.

(56) References Cited

U.S. PATENT DOCUMENTS

| 9,552,845 B2 | 1/2017 | Riedmiller et al. |
| 10,062,367 B1 | 8/2018 | Evans et al. |

(Continued)

FOREIGN PATENT DOCUMENTS

| JP | 2008-216472 A | 9/2008 |
| KR | 10-2013-0093763 A | 8/2013 |

(Continued)

OTHER PUBLICATIONS

Machine translation of KR 10-2017-0060409 (Year: 2017).*

(Continued)

*Primary Examiner* — Andrew Sniezek
(74) *Attorney, Agent, or Firm* — Sughrue Mion, PLLC

(57) ABSTRACT

An electronic device may include an audio output device; and a processor configured to be operatively connected to the audio output device. The processor is configured to: acquire a first user input for reproducing a first audio related to a first application; based on the first user input, generate first decoded data by decoding the first audio using a first codec; generate first synthesized data by applying a first audio effect to the first decoded data; transmit the first synthesized data to an audio framework; based on the first audio being decoded using the first codec, transmit, to the audio framework, a first request for deactivating a function of applying a second audio effect; and output the first synthesized data via the audio output device without applying the second audio effect to the first synthesized data, based on the function of applying the second audio effect being deactivated.

20 Claims, 11 Drawing Sheets

(56) References Cited

U.S. PATENT DOCUMENTS

| | | |
|---|---|---|
| 10,133,541 B2 | 11/2018 | Seo |
| 10,474,421 B2 | 11/2019 | Park et al. |
| 10,628,119 B2 | 4/2020 | Li et al. |
| 11,405,725 B2 | 8/2022 | Park et al. |
| 11,579,835 B2 | 2/2023 | Zhang et al. |
| 2004/0233338 A1 | 11/2004 | Han |
| 2008/0215343 A1 | 9/2008 | Goto et al. |
| 2010/0153119 A1 | 6/2010 | Lee et al. |
| 2014/0133683 A1 | 5/2014 | Robinson et al. |
| 2016/0021476 A1 | 1/2016 | Robinson et al. |
| 2017/0147282 A1 | 5/2017 | Seo |
| 2018/0047400 A1 | 2/2018 | Chen et al. |
| 2019/0019509 A1 | 1/2019 | Lee et al. |
| 2020/0258531 A1 | 8/2020 | Purnhagen et al. |
| 2021/0104249 A1 | 4/2021 | Fotopoulou et al. |
| 2021/0132898 A1 | 5/2021 | Lee et al. |

FOREIGN PATENT DOCUMENTS

| | | |
|---|---|---|
| KR | 10-2017-0060409 A | 6/2017 |
| KR | 10-2019-0008663 A | 1/2019 |

OTHER PUBLICATIONS

International Search Report dated Sep. 29, 2022, issued by the International Searching Authority in counterpart International Application No. PCT/KR2022/009312 (PCT/ISA/210).
Written Opinion dated Sep. 29, 2022, issued by the International Searching Authority in counterpart International Application No. PCT/KR2022/009312 (PCT/ISA/237).
Communication issued Jul. 19, 2024 by the European Patent Office in European Patent Application No. 22833627.7.

* cited by examiner

METHOD FOR PREVENTING DUPLICATE APPLICATION OF AUDIO EFFECTS TO AUDIO DATA AND ELECTRONIC DEVICE SUPPORTING THE SAME

CROSS-REFERENCE TO RELATED APPLICATION(S)

This application is a continuation of International Application No. PCT/KR2022/009312, filed on Jun. 29, 2022, which is based on and claims priority to Korean Patent Application No. 10-2021-0085750, filed on Jun. 30, 2021, in the Korean Intellectual Property Office, the disclosure of which are incorporated by reference herein in their entireties.

BACKGROUND

1. Field

Various embodiments of the disclosure relate to a method for preventing a duplicate application of an audio effect to audio data, and an electronic device supporting the same.

2. Description of the Related Art

An electronic device may encode or decode audio data through an audio codec. The electronic device may decode audio data encoded through the audio codec. The electronic device may apply an audio effect (for example, spatial impression, audio volume, noise removal) to the decoded audio data in an audio framework. The electronic device may output the audio data, to which the audio effect has been applied, through an audio output device (for example, speaker, earphone).

An audio codec capable of applying an audio effect to audio data (hereinafter, referred to as next-generation audio codec) may decode encoded audio data. The next-generation audio codec may receive an inputted parameter therein and may apply an audio effect to decoded audio data. When an electronic device outputs audio data through the next-generation audio codec, the electronic device may apply an audio effect to the audio data through the next-generation audio codec, and may apply an additional audio effect to the audio data to which the audio effect has been applied in an audio framework. Such a duplicate application of the audio effect to the audio data may damage the audio data, or the sound intended by the audio producer may not be output. Alternatively, when the electronic device outputs audio of a first application through the next-generation audio codec, the electronic device may apply an audio effect to audio data through the next-generation audio codec and, in order to prevent a duplicate application of the audio effect, may deactivate a function for applying an additional audio effect to be performed in an audio framework. However, if the electronic device outputs audio of a second application while the function for applying an additional audio effect remains deactivated, the electronic device may fail to apply the additional audio effect to audio data of the second application. Thus, although the function for applying an additional audio effect has been deactivated to prevent a duplicate application of the audio effect with respect to the first application, the function for applying an additional audio effect may be needed with respect to the second application because, when the deactivated state continues, no additional audio effect may be applied to the audio data of the second application.

Various embodiments described herein may provide a method for preventing a duplicate application of an audio effect to audio data, and an electronic device therefor.

SUMMARY

According to an aspect of an example embodiment of the disclosure, provided is an electronic device including: an audio output device; and a processor configured to be operatively connected to the audio output device, wherein the processor is further configured to: execute a first application; acquire a first user input for reproducing a first audio related to the first application; based on the first user input, generate first decoded data by decoding the first audio using a first codec; generate first synthesized data by applying a first audio effect to the first decoded data via the first codec; transmit the first synthesized data to an audio framework; based on the first audio being decoded using the first codec, transmit, to the audio framework, a first request for deactivating a function of applying a second audio effect; deactivate the function of applying the second audio effect in the audio framework based on the first request; and output the first synthesized data via the audio output device without applying the second audio effect to the first synthesized data, based on the function of applying the second audio effect being deactivated.

According to an aspect of an example embodiment of the disclosure, provided is an electronic device including: an audio output device; and a processor configured to be operatively connected to the audio output device, wherein the processor is further configured to: execute a first application; acquire a first user input for reproducing a first audio related to the first application; based on the first user input, generate first decoded data by decoding the first audio via a first codec; generate first synthesized data by applying a first audio effect to the first decoded data via the first codec; transmit the first synthesized data to an audio framework; acquire time information on a first time point at which the first audio is decoded via the first codec; transmit the acquired time information to the audio framework; control, based on a comparison between the first time point and a current time point, the audio framework to deactivate a function of applying a second audio effect in the audio framework; and output the first synthesized data via the audio output device without applying the second audio effect to the first synthesized data, based on the function of applying the second audio effect being deactivated.

According to an aspect of an example embodiment of the disclosure, provided is a method of operating an electronic device, the method including: executing a first application; acquiring a first user input for reproducing a first audio related to the first application; based on the first user input, generating first decoded data by decoding the first audio via a first codec; generating first synthesized data by applying a first audio effect to the first decoded data via the first codec; transmitting the first synthesized data to an audio framework; transmitting, to the audio framework, a first request for deactivating a function of applying a second audio effect; based on the first request, deactivating the function of applying the second audio effect in the audio framework; and outputting the first synthesized data via an audio output device without applying the second audio effect to the first synthesized data, based on the function of applying the second audio effect being deactivated.

According to an aspect of an example embodiment of the disclosure, provided is a method of operating an electronic device, the method including: executing a first application;

acquiring a first user input for reproducing a first audio related to the first application; based on the first user input, generating first decoded data by decoding the first audio via a first codec; generating first synthesized data by applying a first audio effect to the first decoded data via the first codec; transmitting the first synthesized data to an audio framework; acquiring time information on a first time point at which the first audio is decoded via the first codec; transmitting the acquired time information to the audio framework, and controlling the audio framework to deactivate a function of applying a second audio effect, based on a comparison between the first time point and a current time point; and outputting the first synthesized data via an audio output device without applying the second audio effect to the first synthesized data, based on the function of applying the second audio effect being deactivated.

According to various embodiments of the disclosure, an electronic device using a next-generation audio codec may avoid duplicate application of an audio effect to audio data.

According to various embodiments of the disclosure, an electronic device may sense whether a next-generation audio codec operates, thereby activating or deactivating a function for applying an additional audio effect performed in an audio framework.

According to various embodiments of the disclosure, an electronic device may deliver information indicating whether an audio effect has been applied to audio data through a next-generation audio codec to an audio framework, thereby activating or deactivating a function for applying an additional audio effect performed in an audio framework.

As a result, damage to the audio data may be prevented, and sounds intended by the audio producer may be output.

Various other advantageous effects identified explicitly or implicitly through the disclosure may be provided.

BRIEF DESCRIPTION OF THE DRAWINGS

The above and other aspects, features, and advantages of various embodiments of the disclosure will be more apparent from the following description taken in conjunction with the accompanying drawings.

DETAILED DESCRIPTION

Figure 1:
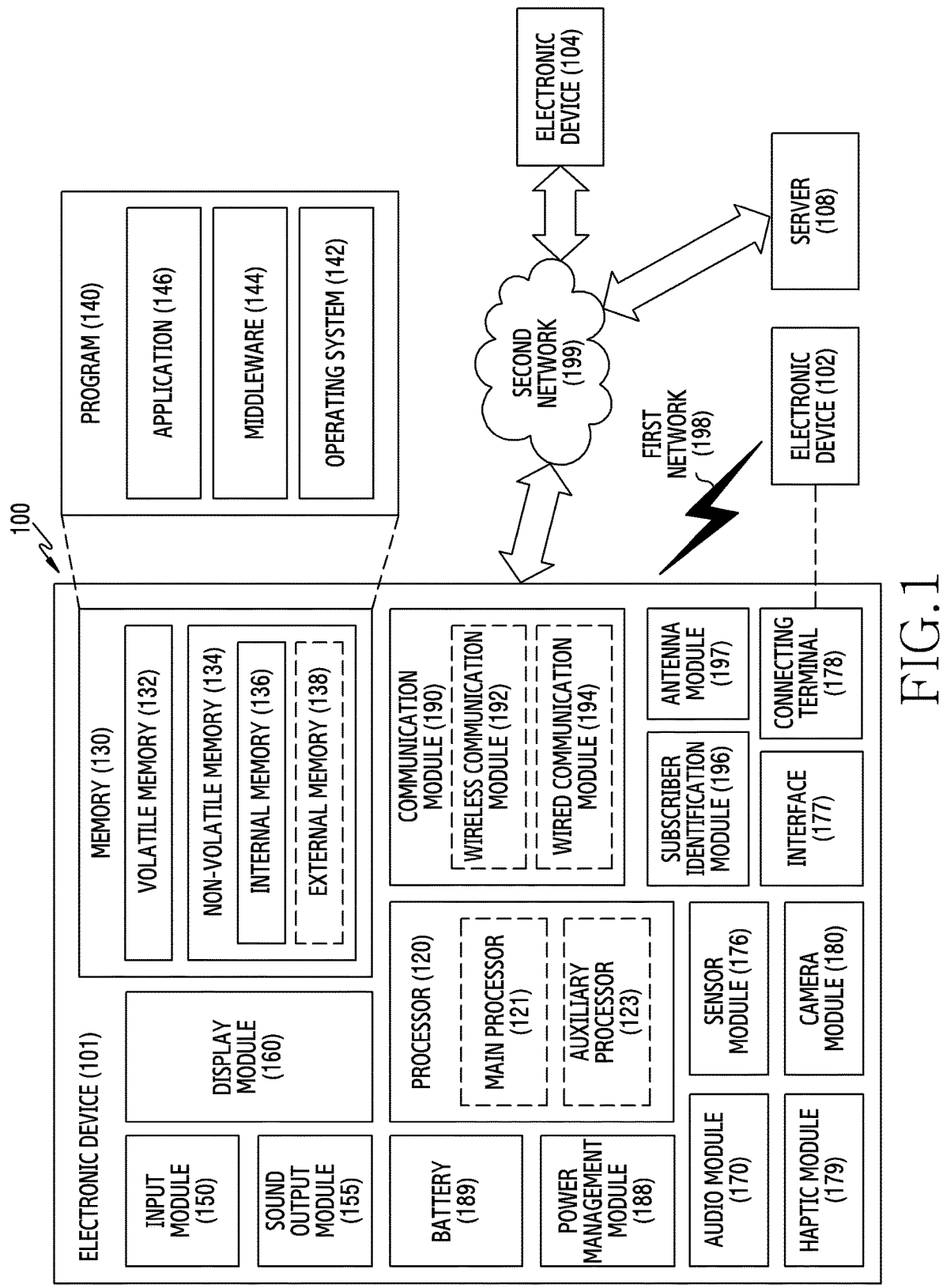
FIG. 1 is a block diagram illustrating an electronic device in a network environment according to an embodiment.

Hereinafter, various embodiments will be described with reference to the accompanying drawings. However, this is not intended to limit the specific embodiments, and it should be understood that various modifications, equivalents, and/or alternatives of the embodiments are included. In connection with the description of the drawings, the same or similar reference numerals may be used for the same or similar components.

FIG. 1 is a block diagram illustrating an electronic device in a network environment according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
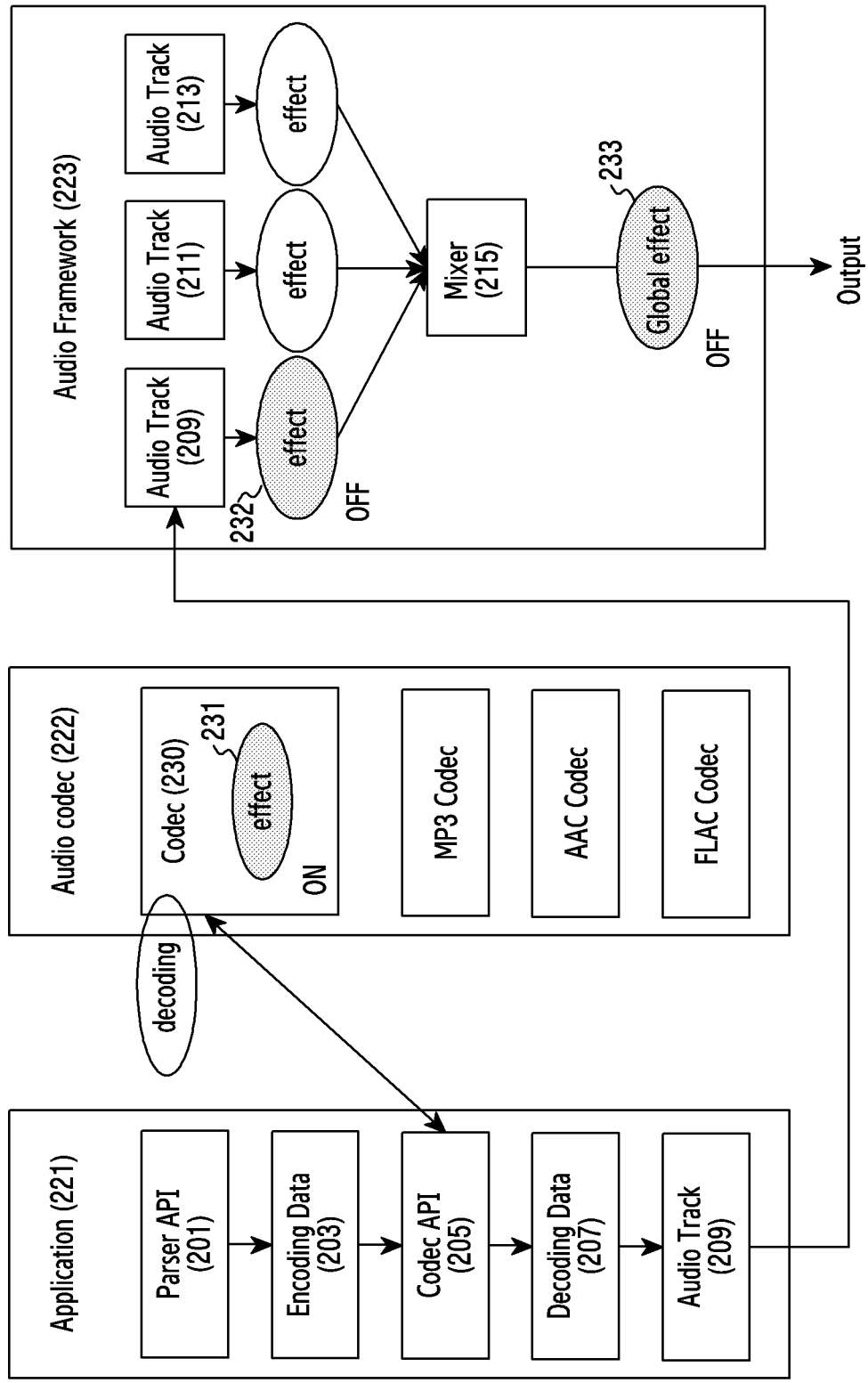
FIG. 2 illustrates a method of outputting audio data by an electronic device without overlapping an audio effect to audio data according to an embodiment.

FIG. 2 illustrates a method of outputting audio data by an electronic device without overlapping an audio effect to audio data according to an embodiment.

Referring to FIG. 2, an electronic device (e.g., an electronic device 301 of FIG. 3) may use software (e.g., an application 221, an audio codec 222, or an audio framework 223) driven by a processor (e.g., a processor 310 of FIG. 3) to output audio data (e.g., encoded data 203) without overlapping audio effects (e.g., a first audio effect 231, a second audio effect 232, and a third audio effect 233) to the audio data. For example, the electronic device may output the audio data by applying the first audio effect 231.

According to an embodiment, the application 221 may extract the encoded data 203 through a parser API 201. The application 221 may decode the encoded data 203 through a codec API 205 to thereby generate decoded data 207. The application 221 may generate an audio track 209.

According to an embodiment, the audio codec 222 may include one or more codecs (e.g., a codec 230, an MPEG-2.5 Part. 3 (MP3) codec, an advanced audio coding (AAC) codec, and a free lossless audio codec (FLAC) codec).

According to an embodiment, the audio framework 223 may include one or more audio tracks 209, 211, and 213. The audio framework 223 may output audio data to which the first audio effect 231 is applied without applying the audio effect (e.g., the second audio effect 232 or the third audio effect 233) to audio data (e.g., decoded data 207) provided through the audio track 209 from the application 221.

According to an embodiment, when the electronic device (e.g., the electronic device 301 of FIG. 3) applies the first audio effect 231 to the audio data while performing decoding on audio data (e.g., encoding audio data 203) using the codec 230, the electronic device (e.g., the electronic device 301 of FIG. 3) may omit an operation of applying the second audio effect 232 to the decoded data in the audio framework 223. The audio effects (e.g., the first audio effect 231, the second audio effect 232, and the third audio effect 233) are shown in FIG. 2 for convenience of explanation, but unlike the components shown in FIG. 2, the audio effect does not exist as a separate software module and may include a specific tuning value or file for sound adjustment.

Figure 3:
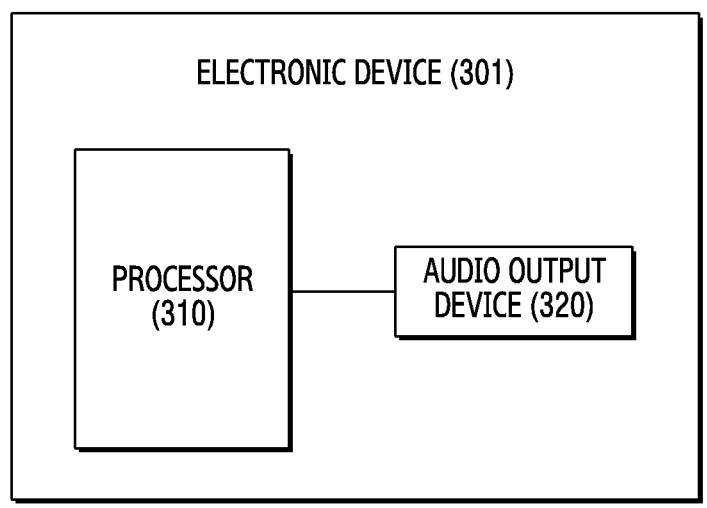
FIG. 3 is a block diagram illustrating an electronic device according to an embodiment.

According to an embodiment, the application 221, the audio codec 222, and the audio framework 223 may be software executed on the processor (e.g., the processor 310 of FIG. 3). For example, the operation of the application 221, the audio codec 222, and the audio framework 223 may be understood as the operation of the processor 310. At least one of the application 221, the audio codec 222, and the audio framework 223 may be integrated or may further include a separate module.

According to an embodiment, the electronic device (e.g., the electronic device 301 of FIG. 3) may execute the application 221 (e.g., a first application). For example, the electronic device may execute a music playback application. For example, the music playback application may include an application that reproduces a file stored in a memory (e.g., the memory 130 of FIG. 1) and a streaming application that reproduces a file (or streaming data) received through a communication module (e.g., the communication module 190 of FIG. 1). The electronic device (e.g., the electronic device 301 of FIG. 3) may acquire a first user input that reproduces audio related to the application 221 while the application 221 is being executed. For example, the electronic device (e.g., the electronic device 301 of FIG. 3) may acquire a user input (e.g., a touch input, a button input, a gesture input, a drag input, or a voice input) that reproduces music of the music playback application while the music playback application is being executed.

According to an embodiment, in response to the acquiring of the first user input, the electronic device (e.g., the electronic device 301 of FIG. 3) may call (or execute) a parser through the parser API 201. For example, in response to the acquiring of the first user input, the electronic device (e.g., the electronic device 301 of FIG. 3) may control the application 221 to call the parser through the parser API 201. The electronic device (e.g., the electronic device 301 of FIG. 3) may extract the encoded data 203 from the file through the parser API 201. The file may include, for example, a media file stored in the memory (e.g., the memory 130 of FIG. 1) and/or a streaming file (or streaming data) that is received through the communication module (e.g., the communication module 190 of FIG. 1) and is temporarily stored in the memory 130. According to an embodiment, the electronic device (e.g., the electronic device 301 of FIG. 3) may extract video data from the media data stored in the file through the parser called using the parser API 201. The extracted video data may be encoded data. The file may refer to a module in which media data stored in the application 221 or media data acquired from an external device (e.g., a terminal or a server) are stored. The encoded data 203 may be understood as encoded audio data.

According to an embodiment, the electronic device (e.g., the electronic device 301 of FIG. 3) may call (or generate) one of a plurality of codecs (e.g., the codec 230, an MP3 codec, an ACC codec, and a FLAC codec) included in the audio codec 222 through the codec API 205. For example, the electronic device (e.g., the electronic device 301 of FIG. 3) may control the application 221 to call (or generate) the codec 230 through the codec API 205.

According to an embodiment, the electronic device (e.g., the electronic device 301 of FIG. 3) may use the codec 230 called (or generated) through the codec API 205 in the application 221 to decode the encoded data 203. The electronic device (e.g., the electronic device 301 of FIG. 3) may generate decoded data 207 by decoding the encoded data 203 through the codec 230.

According to an embodiment, the electronic device (e.g., the electronic device 301 of FIG. 3) may apply the first audio effect 231 to the decoded data 207 by using the codec 230. For example, the electronic device may apply a tuning value corresponding to various effects (e.g., sense of space, volume size, noise removal, and the like) to the decoded data 207 by using the codec 230. The electronic device may generate synthesized data by applying the first audio effect 231 to the decoded data 207. The synthesized data may refer to decoded data to which the first audio effect 231 is applied. The decoded data 207 or the synthesized data may be understood as pulse code modulation (PCM) data.

According to an embodiment, the audio codec 222 may include a codec 230, an MP3 codec, an AAC codec, and a FLAC codec. Examples of the audio codec 222 may not be limited to the types of codecs shown in FIG. 2.

According to an embodiment, the electronic device (e.g., the electronic device 301 of FIG. 3) may generate the audio track 209. For example, the electronic device may control the application 221 to generate the audio track 209. The audio track 209 may transmit the decoded data 207 or the synthesized data from the application 221 to the audio framework 223 or may manage the decoded data 207 or the synthesized data. The electronic device (e.g., the electronic device 301 of FIG. 3) may transmit the decoded data 207 or the synthesized data from the application 221 to the audio framework 223 through the audio track 209.

According to an embodiment, the electronic device (e.g., the electronic device 301 of FIG. 3) may generate a plurality of audio tracks 209, 211, and 213 in the application 221. The electronic device (e.g., the electronic device 301 of FIG. 3) may transmit corresponding decoded data or synthesized data from the application 221 to the audio framework 223 through each of the plurality of audio tracks 209, 211, and 213.

According to an embodiment, although not shown in FIG. 2, the electronic device (e.g., the electronic device 301 of FIG. 3) may generate the audio tracks 211 and 213 in an application (e.g., a second application) different from the application 221. The electronic device (e.g., the electronic device 301 of FIG. 3) may provide the decoded data or the synthesized data to the audio framework 223 through the audio tracks generated in the different applications.

According to an embodiment, the electronic device (e.g., the electronic device 301 of FIG. 3) may deactivate a function of applying the second audio effect 232 for each audio track of the audio framework 223 according to whether the first audio effect 231 is applied. For example, when the first audio effect 231 is applied to the decoded data 207 transmitted from the application 221 to the audio framework 223 through a first audio track (e.g., the audio track 209), the electronic device (e.g., the electronic device 301 of FIG. 3) may deactivate a function of applying the second audio effect 232 corresponding to the first audio track (e.g., the audio track 209). The electronic device does not apply the second audio effect 232 and the third audio effect 233 to the synthesized data generated by applying the first audio effect 231 to the decoded data 207, and may output the synthesized data through an audio output device (e.g., an audio output device 320 of FIG. 3).

According to an embodiment, the second audio effect 232 and the third audio effect 233 may be performed in the audio framework 223. The second audio effect 232 may be understood as a local audio effect that may be performed before audio data (e.g., the decoded data 207 or the synthesized data) provided from the application (e.g., the application 221) is mixed by the mixer 215. The third audio effect 233 may be understood as a global audio effect that may be performed after the audio data is mixed by the mixer 215.

According to an embodiment, the electronic device (e.g., the electronic device 301 of FIG. 3) may output the synthesized data generated by applying the first audio effect 231 to the decoded data 207 through the audio output device (e.g., the audio output device 320 of FIG. 3). For example, the electronic device (e.g., the electronic device 301 of FIG. 3) may output the synthesized data generated by applying only one audio effect (e.g., the first audio effect 231) to the audio data (e.g., the decoded data 207), through the audio output device (e.g., the audio output device 320 of FIG. 3).

FIG. 3 is a block diagram illustrating the electronic device 301 according to an embodiment.

Referring to FIG. 3, the electronic device 301 may include the processor 310 and the audio output device 320. Components included in the electronic device 301 may not be limited to the components shown in FIG. 3 (e.g., the processor 310 and the audio output device 320). The components of the electronic device 301 illustrated in FIG. 3 may be replaced with other components, or additional components may be added to the electronic device 301. For example, at least a portion of the contents of the electronic device 101 of FIG. 1 may be applied to the electronic device 301 of FIG. 3. For another example, the electronic device 301 may include a codec or a memory. The codec may be implemented as software and/or hardware. For example, the codec may be understood as software as an algorithm driven by the processor 310. As another example, the codec may be implemented as hardware in which the algorithm is implemented by the processor 310.

According to an embodiment, the processor 310 may execute instructions stored in the memory to control the operation of the component (e.g., the audio output device 320) of the electronic device 301. The processor 310 may be electrically and/or operatively connected to the audio output device 330. The processor 310 may execute software to control at least one other component (e.g., the audio output device 320) connected to the processor 310. The processor 310 may acquire commands from the components included in the electronic device 301, may interpret the acquired command, and may process and/or operate a variety of data according to the interpreted command.

According to an embodiment, the codec may include a coder that converts an analog audio signal of a voice or video into a digital audio signal to perform encoding, and a decoder that converts a digital signal into an analog signal to perform decoding.

According to an embodiment, the codec may have a function of applying, to decoded data (e.g., the decoded data 207 of FIG. 2), various audio effects including location information of audio, a volume of an output device, a change in sound, applying a sense of space, noise processing (e.g., noise or echo attenuation), or a channel change (e.g., switching between mono and stereo). For example, an AC4 codec or an MPEG-H codec may receive a parameter corresponding to a sense of space, and may apply an audio effect (e.g., the first audio effect 231) to the decoded data (e.g., the decoded data 207 of FIG. 2) based on the parameter. The codec may include, for example, at least one of a Dolby ac-4 (AC4) codec, a moving picture experts group (MPEG-H) codec, an MP3 codec, an AAC codec, and a FLAC codec.

According to an embodiment, the audio output device 320 may output sound corresponding to audio data. For example, the electronic device 301 may output synthesized data generated by applying the first audio effect 231 to the decoded data (e.g., the decoded data 207 of FIG. 2) through the audio output device 320. The audio output device 320 may include, for example, at least one of a speaker and an earphone.

Figure 4A:
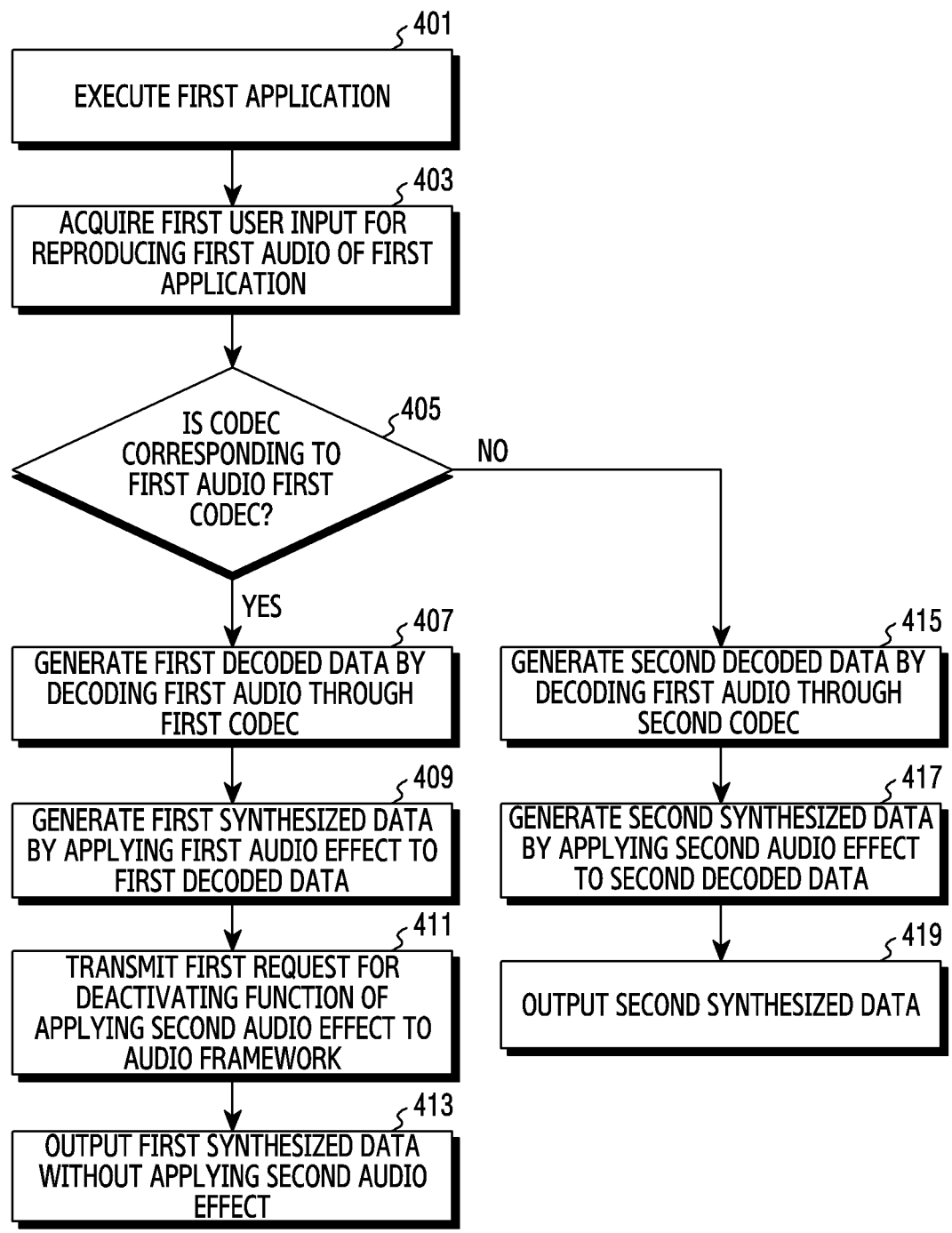
FIG. 4A is a flowchart illustrating a method of controlling an application of an audio effect based on decoding by an audio codec according to an embodiment.

FIG. 4A is a flowchart illustrating a method of controlling an application of an audio effect based on decoding by an audio codec according to an embodiment.

A series of operations described below may be simultaneously performed or sequentially performed, in the same sequence or in a sequence different from the sequence described below, by the electronic device 301 or a processor (e.g., the processor 120 of FIG. 1 or the processor 310 of FIG. 3), and some operations may be omitted, modified, or added.

In operation 401, the electronic device 301 may execute a first application (e.g., the application 221 of FIG. 2). The first application may be understood as an application capable of reproducing multimedia data. For example, the first application may be a music playback application or a video playback application.

In operation 403, the electronic device 301 may acquire a first user input for reproducing first audio related to the first application. For example, the electronic device 301 may acquire a touch input for reproducing music of the music playback application. While the first application is being executed, the electronic device 301 may acquire the first user input for reproducing the first audio related to the first application. For example, while the music playback application is being executed, the electronic device 301 may acquire a gesture input for reproducing music of the music playback application. The first user input may include a touch input, a button input, a gesture input, a drag input, or a voice input.

In operation 405, the electronic device 301 may identify whether a codec corresponding to the first audio is a first codec or a second codec. The electronic device 301 may identify whether the codec corresponding to the first audio is the first codec or the second codec using a parser executed through the parser API 201. The first codec may be a codec that supports a function of applying the first audio effect 231. The second codec may be a codec that does not support the function of applying the first audio effect 231.

According to an embodiment, the electronic device 301 may perform operation 407 when the codec corresponding to the first audio is determined as the first codec (operation 405—YES), and may perform operation 415 when the codec corresponding to the first audio is determined as the second codec (operation 405—NO).

In operation 407, when the codec corresponding to the first audio is the first codec, the electronic device 301 may decode the first audio through the first codec. The electronic device 301 may generate first decoded data by decoding the first audio through the first codec. The first audio may be understood as encoded data.

In operation 409, the electronic device 301 may apply the first audio effect 231 to the first decoded data. The electronic device 301 may generate first synthesized data by applying the first audio effect 231 to the first decoded data.

According to an embodiment, the electronic device 301 may generate an audio track (e.g., the audio track 209 of FIG. 2). The electronic device 301 may transmit the first synthesized data to the audio framework 223 through the audio track.

In operation 411, in response to the electronic device 301 determining that the first codec performs decoding through an audio codec (e.g., the audio codec 222 of FIG. 2 and/or the audio codec 222 of FIG. 5), the electronic device 301 may transmit a first request for deactivating the function of applying the second audio effect 232 to the audio framework 223.

According to an embodiment, the electronic device 301 may control the first application to transmit the first request to the audio framework 223. For example, the first codec may perform decoding on the first audio to generate first decoded data, and in response to generating the first synthesized data by applying the first audio effect 231 to the first decoded data, the electronic device 301 may transmit a first request for deactivating the function of applying the second audio effect 232 (and the third audio effect 233) to the audio framework 233.

Figure 5:
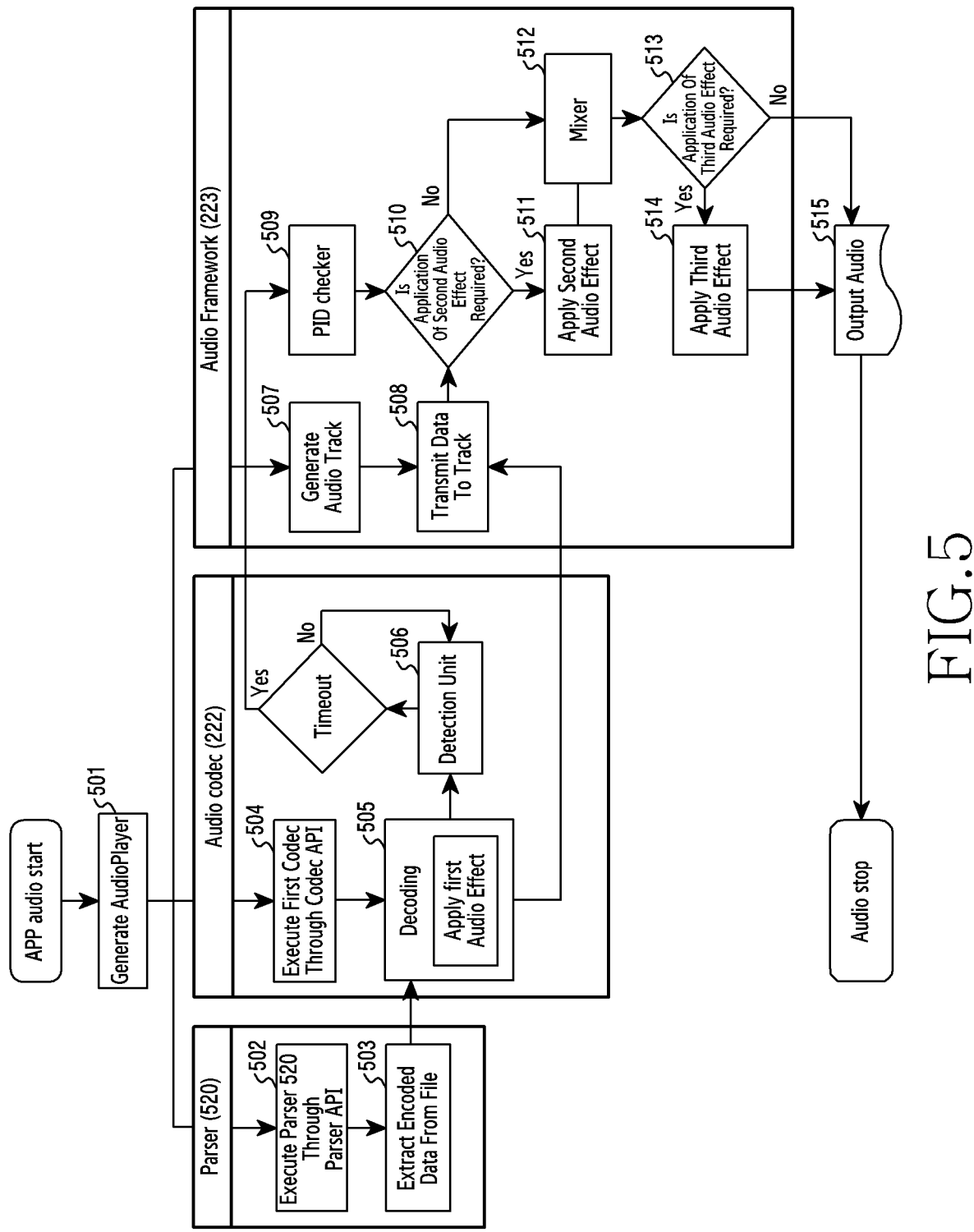
FIG. 5 illustrates a method of detecting whether decoding is performed by an audio codec according to an embodiment.

According to an embodiment, the electronic device 301 may detect whether the first codec (e.g., the codec 230 of FIG. 2) performs decoding on the first audio through an audio codec (e.g., the audio codec 222 of FIG. 2 and/or a detection unit of the audio codec 222 of FIG. 5). The audio codec may be software including at least one codec, and a detection unit (e.g., the detection unit of the audio codec 222 of FIG. 5) that detects whether the decoding of the at least one codec is performed may exist inside the audio codec.

According to an embodiment, when the first codec performs decoding, the electronic device 301 (e.g., the detection unit of the audio codec 222) may acquire time information corresponding to a time point at which the first codec performs decoding through the audio codec 222. For example, the detection unit of the audio codec 222 may acquire time information on a first time point corresponding to a time at which the encoded data 203 is decoded. The detection unit of the audio codec 222 may determine whether decoding is performed using the first codec at a predetermined time interval (e.g., one second). The predetermined time interval is not limited to the above example and may be configured to various values by the user.

According to an embodiment, the detection unit of the audio codec 222 may compare the first time point with a current time point at the predetermined time interval, and may determine whether the first codec performs decoding based on the comparison result. For example, the detection unit of the audio codec 222 may determine that the first codec performs decoding when a difference between the first time point and the current time point is less than a designated value, and may determine that the first codec does not perform decoding when the difference is equal to or greater than the designated value.

According to an embodiment, the electronic device 301 may transmit the first request (or a message) and identifier information (e.g., an application ID) of the first application that transmits the first request, to the audio framework 223.

In operation 413, in response to the audio framework 223 receiving the first request, the electronic device 301 may deactivate the function of applying additional audio effect (e.g., the second audio effect 232 and the third audio effect 233). In response to the deactivating of the second audio effect 232 (and the third audio effect 233), the electronic device 301 may output the first synthesized data through the audio output device 320 without applying the second audio effect 232 and the third audio effect 233 to the first synthesized data. For example, the electronic device 301 may output the first synthesized data to which the first audio effect 231 is applied and the second audio effect 232 and the third audio effect 233 are not applied, through the audio output device 320.

In operation 415, when the codec corresponding to the first audio is not the first codec, for example, the second codec, the electronic device 301 may decode the first audio through the second codec. The electronic device 301 may decode the first audio to generate second decoded data. The first audio may be understood as encoded data. The second encoding may be understood as a codec that does not support the function of applying the first audio effect 231 to the first audio.

According to an embodiment, the electronic device 301 may generate an audio track (e.g., the audio track 209 of FIG. 2). The electronic device 301 may transmit the second decoded data to the audio framework 223 through the audio track.

In operation 417, the electronic device 301 may apply the second audio effect 232 to the second decoded data. The electronic device 301 may apply the second audio effect 232 to the second decoded data to generate second synthesized data.

In operation 419, the electronic device 301 may output the second synthesized data through the audio output device 320. The second synthesized data may be understood as audio data to which the first audio effect 231 is not applied and the second audio effect 232 (and the third audio effect 233) is applied.

Figure 4B:
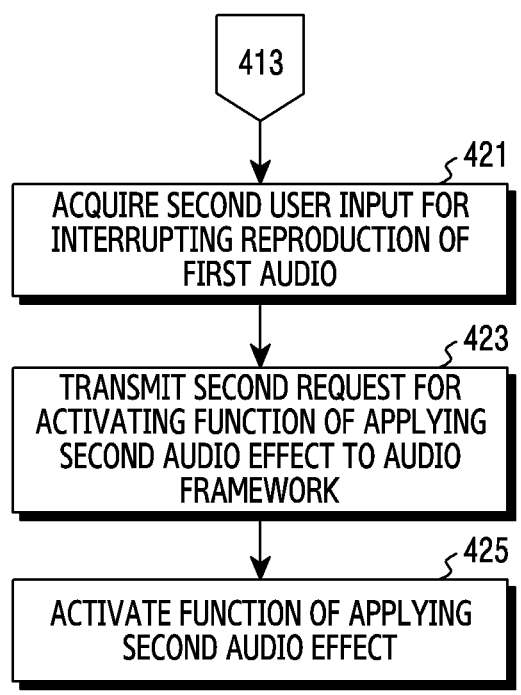
FIG. 4B is a flowchart illustrating a method of controlling an application of an audio effect based on non-decoding by an audio codec according to an embodiment.

FIG. 4B is a flowchart illustrating a method of controlling an application of an audio effect based on non-decoding by an audio codec according to an embodiment.

A series of operations described below may be simultaneously performed or sequentially performed, in the same sequence or in a sequence different from the sequence described below, by the electronic device 301 or a processor (e.g., the processor 120 of FIG. 1 or the processor 310 of FIG. 3), and some operations thereof may be omitted, modified, or added.

In operation 421, the electronic device 301 may acquire a second user input for stopping reproduction of the first audio. The electronic device 301 may acquire the second user input for interrupting reproduction of the first audio while outputting the first synthesized data.

According to an embodiment, in response to the acquiring of the second user input, the electronic device 301 may interrupt an operation of decoding the first audio through the first codec.

In operation 423, in response to the interruption of the decoding through the first codec, the electronic device 301 may transmit a second request for activating a function of applying the second audio effect 232, to the audio framework 223.

According to an embodiment, the electronic device 301 may control the first application to transmit the second request to the audio framework 223.

According to an embodiment, when the first codec does not perform decoding, the electronic device 301 (or the detection unit of the audio codec 222) may acquire time information corresponding to a time point at which the first codec performs decoding through the audio codec 222. For example, the audio codec 222 or the detection unit of the audio codec 222 may acquire time information on a first time point corresponding to a time when the encoded data 203 is decoded. The audio codec 222 or the detection unit of the audio codec 222 may compare the first time point with the current time point at a predetermined time interval, and may determine whether the first codec performs decoding based on the comparison result. For example, when a difference between the first time point and the current time point is less than a designated value, the audio codec 222 or the detection unit of the audio codec 222 may determine that the first codec performs decoding. For another example, when the difference between the first time point and the current time point is equal to or greater than the designated value, the audio codec 222 or the detection unit of the audio codec 222 may determine that the first codec does not perform decoding.

According to an embodiment, the electronic device 301 may transmit the second request (or a message) and identifier information (e.g., an application ID) of the first application that transmits the second request, to the audio framework 223.

In operation 425, in response to the audio framework 223 receiving the second request, the electronic device 301 may activate the function of applying the second audio effect 232 (and the third audio effect 233).

According to an embodiment, in response to the audio framework 233 receiving the second request, the electronic device 301 may activate the function of applying the second audio effect 232 (and the third audio effect 233). In response to the activation of the second audio effect 232 (and the third audio effect 233), the electronic device 301 may apply the second audio effect 232 (and the third audio effect 233) to decoded data corresponding to the second audio when reproducing the second audio of the second application different from the first application.

FIG. 5 illustrates a method of detecting whether decoding is performed by an audio codec according to an embodiment.

Referring to FIG. 5, the electronic device 301 may execute the application 221 (e.g., the first application). The electronic device 301 may acquire a user input for reproducing the audio of the application 221. In operation 501, in response to the acquiring of the user input, the electronic device 301 may execute an audio player. In operation 502, in response to the execution of the audio player, the electronic device 301 may execute a parser 520 through the parser API 201. In operation 503, the electronic device 301 may extract the encoded data 203 from a corresponding file through the parser 520. The file may include a media file stored in a memory (e.g., the memory 130 of FIG. 1) and/or a streaming file (or streaming data) that is received through a communication module (e.g., the communication module 190 of FIG. 1) and is temporarily stored in the memory 130. The file may refer to a module in which media data stored in the application 221 or media data acquired from an external device (e.g., a terminal or a server) are stored. In operation 504, in response to the generation of the audio player, the electronic device 301 may execute the first codec through the codec API 205. The first codec may refer to a codec that provides a function of applying the first audio effect 231. In operation 505, the electronic device 301 may decode the encoded data 203 through the first codec. The electronic device 301 may generate first decoded data by decoding the encoded data 203 through the first codec. The electronic device 301 may apply the first audio effect 231 to the first decoded data. The electronic device 301 may generate first synthesized data by applying the first audio effect 231 to the first decoded data. In operation 506, the electronic device 301 may acquire time information on a first time point corresponding to a time when the first codec performs decoding through the detection unit of the audio codec 222. The electronic device 301 may compare the first time point of the acquired time information with the current time point through the detection unit of the audio codec 222. The electronic device 301 may determine whether the first codec performs decoding at a predetermined time interval based on the comparison result based on the detection unit of the audio codec 222. When the first codec performs decoding, the electronic device 301 may transmit a first request for deactivating the function of applying the second audio effect 232 (and the third audio effect 233) to the audio framework 223. When the first codec does not perform decoding, the electronic device 301 may transmit a second request for activating the function of applying the second audio effect 232 (and the third audio effect 233) to the audio framework 223. The electronic device 301 may provide identifier information (e.g., an application ID) on the application 221 (e.g., the first application) as well as the first request or the second request to the audio framework 223. In operation 507, the electronic device 301 may generate an audio track. The audio track may be understood as a path through which decoded data is moved. In operation 508, the first synthesized data may be transmitted to the audio framework 223 through the audio track. In operation 509, a PID checker of the audio framework 223 may acquire the identifier information together with the first request or the second request. In operation 510, based on the first request or the second request acquired by the audio framework 223, the electronic device 301 may determine whether the function of applying the second audio effect 232 is required. In operation 511, in response to the audio framework 223 receiving the first request, the electronic device 301 does not apply the second audio effect 232 to the synthesized data, but may transmit the synthesized data to the mixer. In response to the audio framework 223 receiving the second request, the electronic device 301 may determine that it is necessary to apply the second audio effect 232 to the audio data received by the audio framework 223. For example, when the second audio of the second application is reproduced by using a codec that does not provide the function of applying the first audio effect 231, the electronic device 301 may apply the activated second audio effect 232 to the decoded data of the second audio. In operation 512, the electronic device 301 may generate single output data by synthesizing a plurality of pieces of decoded data provided to the mixer. In operation 513, the electronic device 301 may determine whether it is necessary to apply the third audio effect 233 to the single output data. In operation 514, when it is determined that it is necessary to apply the third audio effect 233, the electronic device 301 may apply the third audio effect 233 to the single output data. In operation 515, the electronic device 301 may output data to which the third audio effect 233 is applied or not applied, to the single output data through the audio output device 320.

Figure 6A:
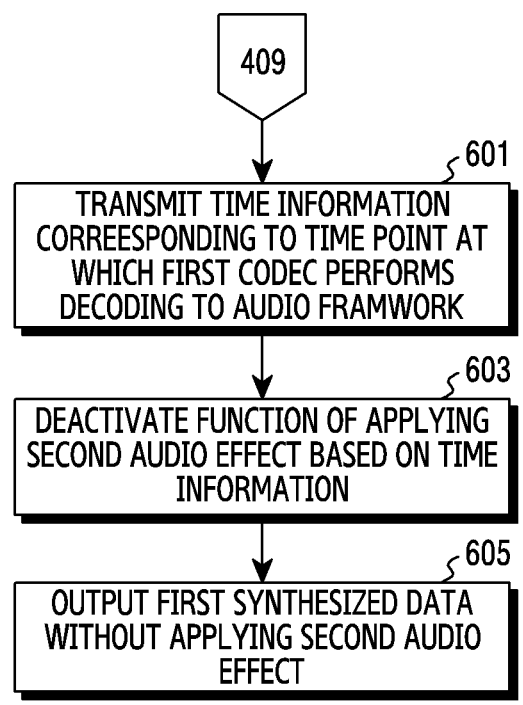
FIG. 6A is a flowchart illustrating a method of controlling an application of an audio effect by an audio framework according to an embodiment.

FIG. 6A is a flowchart illustrating a method of controlling an application of an audio effect by an audio framework according to an embodiment.

A series of operations described below may be simultaneously performed or sequentially performed, in the same sequence or in a sequence different from the sequence described below, by the electronic device 301 or a processor (e.g., the processor 120 of FIG. 1 or the processor 310 of FIG. 3), and some operations thereof may be omitted, modified, or added.

In operation 601, the electronic device 301 may transmit time information corresponding to a time point at which the first codec performs decoding, to the audio framework 223. For example, the audio codec (e.g., the audio codec 222 of FIG. 2) of the electronic device 301 or the detection unit (e.g., the detection unit of the audio codec 222 of FIG. 5) of the audio codec may acquire time information on a first time point corresponding to a time when a first audio is decoded through the first codec. The electronic device 301 may transmit the acquired time information to the audio framework 223. The electronic device 301 may control the audio codec 222 or the detection unit of the audio codec 222 to transmit the acquired time information to the audio framework 223.

In operation 603, the electronic device 301 may deactivate the function of applying the second audio effect 232 based on the time information. The audio framework 223 may determine that the first codec has performed decoding based on the received time information. In response to the audio framework 223 determining that the first codec has performed decoding based on the time information, the electronic device 301 may deactivate the function of applying the second audio effect 232.

According to an embodiment, the audio framework 223 may compare the first time point with the current time point. Based on the comparison result, the audio framework 223 may determine whether the first codec performs decoding. For example, when a difference between the first time point and the current time point is less than a designated value, the audio framework 223 may determine that the first codec performs decoding. For another example, when the difference between the first time point and the current time point is equal to or greater than the designated value, the audio framework 223 may determine that the first codec does not perform decoding.

In operation 605, in response to the audio framework 223 determining that the first codec performs decoding, the electronic device 301 may output first synthesized data through the audio output device 320 without applying the second audio effect 232. In response to the deactivating of the function of applying the second audio effect 232, the electronic device 301 may output the first synthesized data through the audio output device 320 without applying the second audio effect 232. The first synthesized data may refer to data generated by applying the first audio effect 231 to first decoded data decoded by the first codec.

Figure 6B:
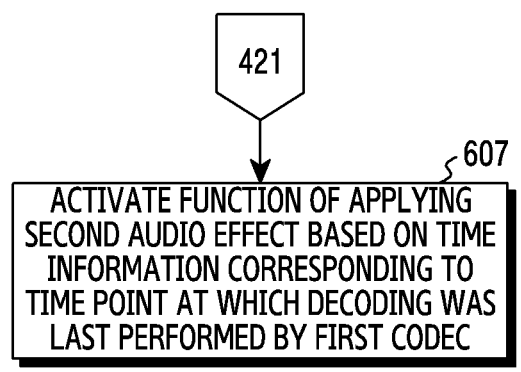
FIG. 6B is a flowchart illustrating a method of controlling an application of an audio effect by an audio framework according to an embodiment.

FIG. 6B is a flowchart illustrating a method of controlling an application of an audio effect by an audio framework according to an embodiment.

In operation 607, the electronic device 301 may acquire a first user input for interrupting reproduction of a first audio while outputting first synthesized data. In response to the first user input for interrupting the reproduction of the first audio, the electronic device 301 may interrupt decoding of the first audio. Before interruption of the decoding, the audio framework 223 may compare a second time point corresponding to a time point at which decoding was last performed by the first codec with a current time point. The audio framework 223 may determine whether the first codec performs decoding based on the comparison result of the second time point and the current time point. For example, when a difference between the second time point and the current time point is less than a designated value, the audio framework 223 may determine that the first codec performs decoding. For another example, when the difference between the second time point and the current time point is equal to or greater than the designated value, the audio framework 223 may determine that the first codec does not perform decoding.

According to an embodiment, in response to the audio framework 223 determining that the first codec does not perform decoding, the electronic device 301 may activate the function of applying the second audio effect 232.

According to an embodiment, in response to the audio framework 223 determining that the first codec performs decoding, the electronic device 301 may deactivate the function of applying the second audio effect 232.

Figure 7:
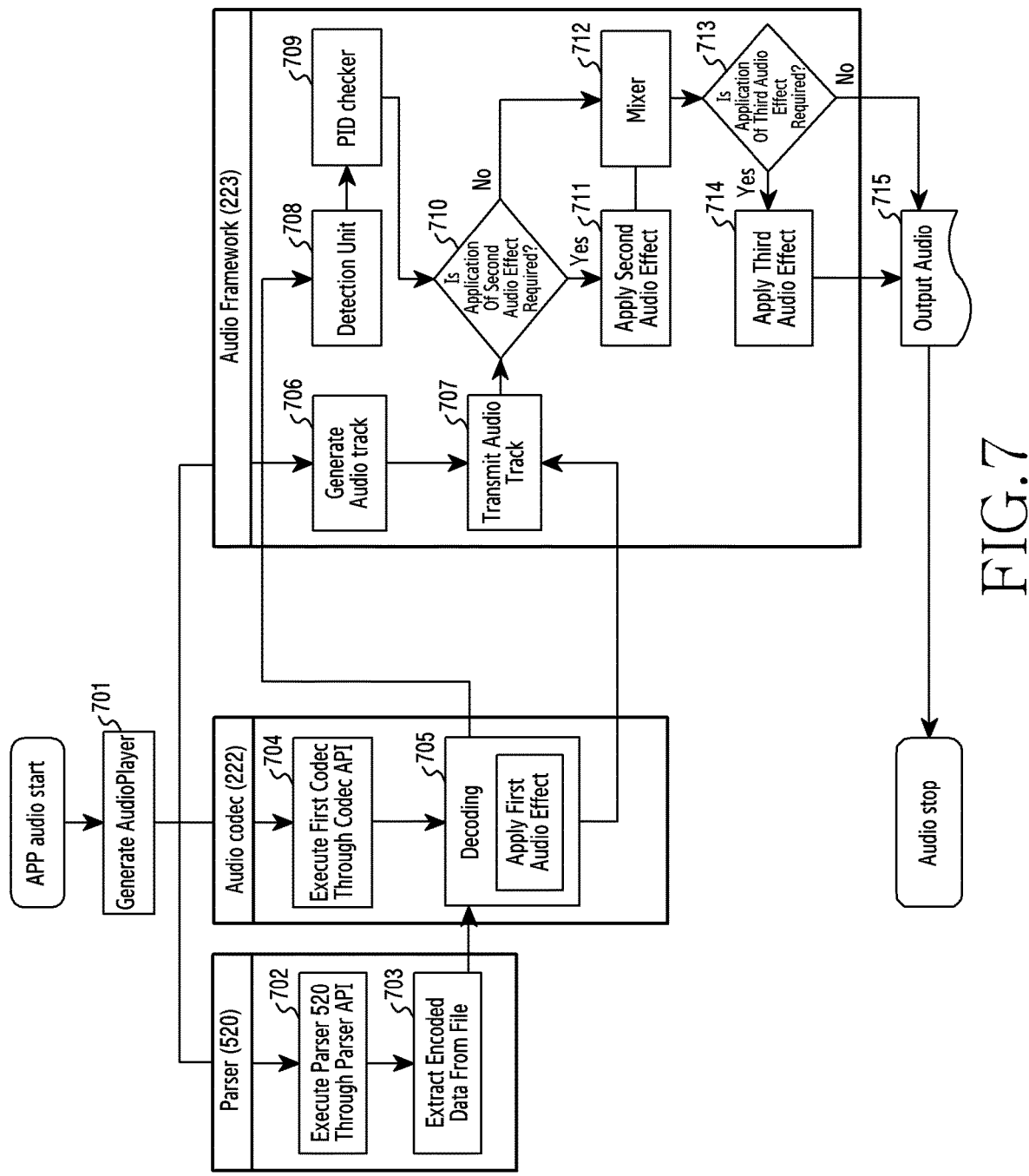
FIG. 7 illustrates a method of detecting, by an audio framework, whether decoding is performed according to an embodiment.

FIG. 7 illustrates a method of detecting, by an audio framework, whether decoding is performed according to an embodiment.

Referring to FIG. 7, the electronic device 301 may execute the application 221 (e.g., a first application). The electronic device 301 may acquire a user input for reproducing the audio of the application 221. In operation 701, in response to the acquiring of the user input, the electronic device 301 may execute an audio player. In operation 702, in response to the execution of the audio player, the electronic device 301 may execute the parser 520 through the parser API 201. In operation 703, the electronic device 301 may extract the encoded data 203 from a corresponding file through the parser 520. The file may include a media file stored in a memory (e.g., the memory 130 of FIG. 1) and/or a streaming file (or streaming data) that is received through a communication module (e.g., the communication module 190 of FIG. 1) and is temporarily stored in the memory 130. The file may refer to a module in which media data stored in the application 221 or media data acquired from an external device (e.g., a terminal or a server) are stored. In operation 704, in response to the generation of the audio player, the electronic device 301 may execute the first codec through the codec API 205. The first codec may refer to a codec that provides a function of applying the first audio effect 231. In operation 705, the electronic device 301 may decode the encoded data 203 through the first codec. The electronic device 301 may generate first decoded data by decoding the encoded data 203 through the first codec. The electronic device 301 may apply the first audio effect 231 to the first decoded data. The electronic device 301 may generate first synthesized data by applying the first audio effect 231 to the first decoded data. The electronic device 301 may transmit information on a time when the first codec performs decoding to the audio framework 223. The electronic device 301 may provide identifier information (e.g., an application ID) on the application 221 (e.g., the first application) to the audio framework 223 (e.g., the detection unit of the audio framework 223). In operation 706, the electronic device 301 may generate an audio track. The audio track may be understood as a path through which the decoded data is moved. In operation 707, the first synthesized data may be transmitted to the audio framework 223 through the audio track. In operation 708, in the electronic device 301, based on information on a time when the first codec performs decoding, the audio framework 223 or the detection unit of the audio framework 223 may determine whether the first codec performs decoding. In operation 709, a PID checker of the audio framework 223 may acquire information on whether decoding is performed and the identifier information. In operation 710, based on the information on the time acquired by the audio framework 223, the audio framework 223 may determine whether the function of applying the second audio effect 232 is required. In operation 711, in response to the audio framework 223 determining that the first codec performs decoding, the electronic device 301 does not apply the second audio effect 232 to the first synthesized data, and may provide the synthesized data to the mixer. In response to the audio framework 223 determining that the first codec does not perform decoding, the electronic device 301 may determine that the function of applying the second audio effect 232 is required. For example, when the second audio of the second application is reproduced using a codec that does not provide the function of the first audio effect 231, the electronic device 301 may apply the activated second audio effect 232 to the decoded data of the second audio data. In operation 712, the electronic device 301 may generate single output data by synthesizing a plurality of pieces of decoded data provided to the mixer. In operation 713, the electronic device 301 may determine whether it is necessary to apply the third audio effect 233 to the single output data. In operation 714, the electronic device 301 may apply the third audio effect 233 to the single output data. In operation 715, the electronic device 301 may output data to which the third audio effect 233 is applied or not applied to the single output data, through the audio output device 320.

Figure 8:
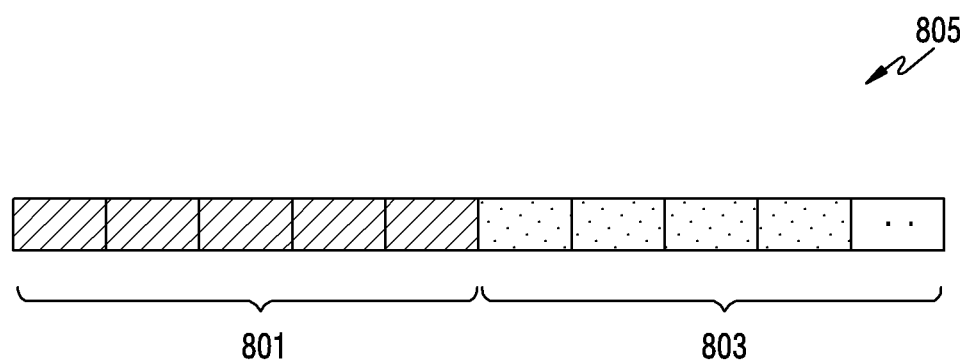
FIG. 8 is a diagram illustrating a configuration of transmission data including information on whether a first audio effect is applied according to an embodiment.

FIG. 8 is a diagram illustrating a configuration of transmission data 805 including information on whether a first audio effect is applied according to an embodiment.

Referring to FIG. 8, the transmission data 805 may include a portion 801 in which a specific character indicating whether the first audio effect 231 is applied to decoded data (e.g., the decoded data 207 of FIG. 2) is inserted, and PCM data 803.

According to an embodiment, the electronic device 301 may transmit the transmission data 805 from an audio codec (e.g., the audio codec 222 of FIG. 2) to the audio framework 223 while reproducing a first audio of a first application.

According to an embodiment, in response to the audio framework 223 receiving the transmission data 805 in which the specific character indicating whether the first audio effect 231 is applied is inserted (e.g., in the portion 801), the electronic device 301 may deactivate a function of applying the second audio effect 232 and the third audio effect 233 that may be performed in the audio framework 223.

According to an embodiment, in response to the audio framework 223 receiving the transmission data 805 in which a specific character indicating a non-application of the first audio effect 231 or a specific character indicating a space is inserted (e.g., in the portion 801), the electronic device 301 may activate the function of applying the second audio effect 232 and the third audio effect 233 that may be performed in the audio framework 223.

Figure 9:
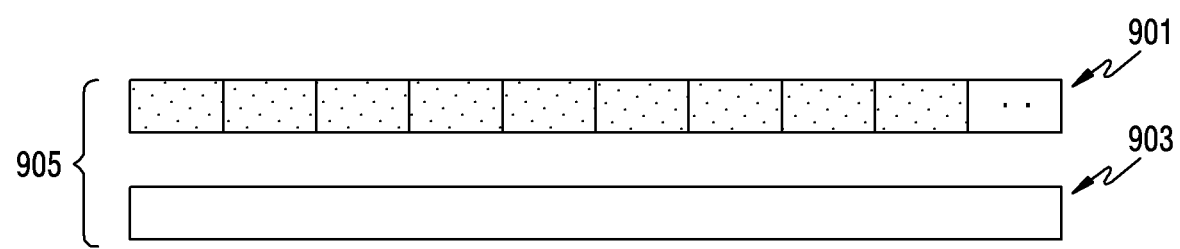
FIG. 9 illustrates a configuration of transmission data including information on whether a first audio effect is applied according to an embodiment.

FIG. 9 illustrates a configuration of transmission data 905 including information on whether a first audio effect is applied according to an embodiment.

Referring to FIG. 9, the transmission data 905 may include data 903 indicating whether the first audio effect 231 is applied to PCM data 901 and decoded data (e.g., the decoded data 207 of FIG. 2). The transmission data 905 may be understood as data obtained by structuring the PCM data 901, the decoded data, and the data 903 indicating whether the first audio effect 231 is applied. The data included in the transmission data 905 may not be limited to the PCM data 901 and the data 903. Although not shown in FIG. 9, the transmission data 905 may include the PCM data 901, the data 903, and setting information data related to the decoded data. According to an embodiment, the electronic device 301 may provide the transmission data 905 from an audio codec (e.g., the audio codec 222 of FIG. 2) to the audio framework 223 while reproducing the first audio of the first application.

According to an embodiment, in response to the audio framework 223 receiving the transmission data 905 including the data 903 indicating the application of the first audio effect 231, the electronic device 301 may deactivate the function of applying the second audio effect 232 and the third audio effect 233 that may be performed in the audio framework 223.

According to an embodiment, in response to the audio framework 223 receiving the transmission data including the data 903 indicating a non-application of the first audio effect 231 or the data 903 indicating a space, the electronic device 301 may activate the function of applying the second audio effect 232 and the third audio effect 233 that may be performed in the audio framework 233.

According to an embodiment, the electronic device 301 may include the audio output device 320 and the processor 301 configured to be operatively connected to the audio output device 320. The processor 310 may execute a first application, may acquire a first user input for reproducing a first audio related to the first application, may determine whether a codec corresponding to the first audio is a first codec or a second codec in response to the acquiring of the first user input, may generate first decoded data by decoding the first audio through the first codec when the codec corresponding to the first audio is the first codec, may generate first synthesized data by applying the first audio effect 231 to the first decoded data through the first codec, may transmit the first synthesized data to the audio framework 223, may transmit a first request for deactivating a function of applying the second audio effect 232 to the audio framework 223 in response to the decoding using the first codec, may deactivate the function of applying the second audio effect 232 in the audio framework 232 based on the first request, and may output the first synthesized data through the audio output device 320 without applying the second audio effect 232 to the first synthesized data, in response to the deactivating of the function of applying the second audio effect 232.

According to an embodiment, the processor 310 may acquire a second user input for interrupting the reproduction of the first audio while outputting the first synthesized data through the audio output device 320, may interrupt the decoding of the first audio through the first codec in response to the acquiring of the second user input, may transmit a second request for activating the function of applying the second audio effect 232 to the audio framework 223 in response to the interruption of the decoding using the first codec, and may activate the function of applying the second audio effect 232 in the audio framework 223 in response to the second request.

According to an embodiment, the processor 310 may generate second decoded data by decoding the first audio through the second codec when the codec corresponding to the first audio is the second codec, may transmit the second decoded data to the audio framework 223, may generate second synthesized data by applying the second audio effect 232 to the second decoded data through the audio framework 223, and may output the second synthesized data through the audio output device 320.

According to an embodiment, the first codec may include a codec that supports a function of applying the first audio effect 231, and the second codec may include a codec that does not support the function of applying the first audio effect 231.

According to an embodiment, the processor 310 may identify a first time point corresponding to a time point at which the first audio is decoded through the first codec in response to the decoding using the first codec, may compare the identified first time point with a current time point at a designated interval, may determine that the first audio is decoded through the first codec when a difference between the first time point and the current time point is less than a designated value, and may determine that the first audio is not decoded through the first codec when the difference between the first time point and the current time point is equal to or greater than the designated value.

According to an embodiment, the processor 310 may transmit identifier information of the first application to the audio framework 223 together with the first request for deactivating the function of applying the second audio effect 232 or the second request for activating the function of applying the second audio effect 232.

According to an embodiment, the processor 310 may transmit, to the audio framework 223, transmission data 805 in which the first synthesized data and the data 801 indicating an application of the first audio effect 231 are synthesized, in response to the applying of the first audio effect 231 to the first decoded data through the first codec.

According to an embodiment, the processor 310 may transmit, to the audio framework 223, transmission data 905 including the first synthesized data and the data 903 indicating an application of the first audio effect 231, in response to the applying of the first audio effect 231 to the first decoded data through the first codec.

According to an embodiment, the electronic device 301 may include the audio output device 320 and the processor 310 configured to be operatively connected to the audio output device 320. The processor 310 may execute a first application, may acquire a first user input for reproducing a first audio related to the first application, may determine whether a codec corresponding to the first audio is a first codec or a second codec in response to the acquiring of the first user input, may generate first decoded data by decoding the first audio through the first codec when the codec corresponding to the first audio is the first codec, may generate first synthesized data by applying the first audio effect 231 to the first decoded data through the first codec, may transmit the first synthesized data to the audio framework 223, may acquire time information on a first time point corresponding to a time point at which the first audio is decoded through the first codec in response to the decoding using the first codec, may transmit the acquired time information to the audio framework 223, may control the audio framework 223 to deactivate a function of applying the second audio effect 232 in the audio framework 223 based on a comparison between the first time point and a current time point, and may output the first synthesized data through the audio output device 320 without applying the second audio effect 232 to the first synthesized data in response to the deactivating of applying the second audio effect 332.

According to an embodiment, the processor 310 may acquire a second user input for interrupting the reproduction of the first audio while outputting the first synthesized data through the audio output device 320, may interrupt the decoding of the first audio through the first codec in response to the acquiring of the second user input, and may control the audio framework 223 to activate the function of applying the second audio effect 232 to be performed in the audio framework 223 based on a comparison between a second time point corresponding to a time point at which the decoding was last performed and a current time point before the interrupting of the decoding.

According to an embodiment, the audio output device 320 may include at least one of a speaker or an earphone.

According to an embodiment, the first codec may include a codec that supports the function of applying the first audio effect 231, and the second codec may include a codec that does not support the function of applying the first audio effect 231.

According to an embodiment, the processor 310 may control the audio framework 223 to compare the first time point with the current time point, may control the audio framework 223 to determine that the first audio is decoded through the first codec when a difference between the first time point and the current time point is less than a designated value, and may control the audio framework 223 to determine that the first audio is not decoded through the first codec when the difference between the first time point and the current time point is equal to or greater than the designated value.

According to an embodiment, the processor 310 may transmit identifier information of the first application to the audio framework 223 together with the time information.

According to an embodiment, the processor 310 may transmit, to the audio framework 223, transmission data 805 in which the first synthesized data and data 801 indicating application of the first audio effect 231 are synthesized, in response to the applying of the first audio effect 231 to the first decoded data through the first codec.

According to an embodiment, the processor 310 may transmit, to the audio framework 223, transmission data 905 including the first synthesized data and data 903 indicating application of the first audio effect 231, in response to the applying of the first audio effect 231 to the first decoded data through the first codec.

According to an embodiment, a method of operating the electronic device 301 may include executing a first application, acquiring a first user input for reproducing a first audio related to the first application, determining whether a codec corresponding to the first audio is a first codec or a second codec in response to the acquiring of the first user input, generating first decoded data by decoding the first audio through the first codec when the codec corresponding to the first audio is the first codec, generating first synthesized data by applying the first audio effect 231 to the first decoded data through the first codec, transmitting the first synthesized data to an audio framework, transmitting a first request for deactivating a function of applying the second audio effect 232 to the audio framework 223 in response to the decoding using the first codec, deactivating the function of applying the second audio effect 232 in the audio framework 223 based on the first request, and outputting the first synthesized data through the audio output device 320 without applying the second audio effect 232 to the first synthesized data, in response to the deactivating of the function of applying the second audio effect 232.

According to an embodiment, the method of operating the electronic device 301 may include acquiring a second user input for interrupting the reproduction of the first audio while outputting the first synthesized data through the audio output device 320, interrupting the decoding of the first audio through the first codec in response to the acquiring of the second user input, transmitting a second request for activating the function of applying the second audio effect 232 to the audio framework 223 in response to the interruption of the decoding using the first codec, and activating the function of applying the second audio effect 232 to be performed in the audio framework 223 in response to the second request.

According to an embodiment, the method of operating the electronic device 301 may include executing a first application, acquiring a first user input for reproducing a first audio related to the first application, determining whether a codec corresponding to the first audio is a first codec or a second codec in response to the acquiring of the first user input, generating first decoded data by decoding the first audio through the first codec when the codec corresponding to the first audio is the first codec, generating first synthesized data by applying the first audio effect 231 to the first decoded data through the first codec, transmitting the first synthesized data to the audio framework 223, acquiring time information on a first time point corresponding to a time point at which the first audio is decoded through the first codec in response to the decoding using the first codec, transmitting the acquired time information to the audio framework 223, controlling the audio framework 223 to deactivate a function of applying the second audio effect 232 in the audio framework 223 based on a comparison between the first time point and a current time point, and outputting the first synthesized data through the audio output device 320 without applying the second audio effect 232 to the first synthesized data in response to the deactivating of applying the second audio effect 232.

According to an embodiment, the method of operating the electronic device 301 may include acquiring a second user input for interrupting the reproduction of the first audio while outputting the first synthesized data through the audio output device 320, interrupting the decoding of the first audio through the first codec in response to the acquiring of the second user input, and controlling the audio framework 223 to activate the function of applying the second audio effect 232 to be performed in the audio framework 223 based on a comparison between a second time point corresponding to a time point at which the decoding was last performed and a current time point before the interrupting of the decoding.

According to an embodiment, a computer program stored in a recording medium in association with the electronic device 301 to execute the following operations may be provided, wherein the operations may include executing a first application, acquiring a first user input for reproducing a first audio related to the first application, determining whether a codec corresponding to the first audio is a first codec or a second codec in response to the acquiring of the first user input, generating first decoded data by decoding the first audio through the first codec when the codec corresponding to the first audio is the first codec, generating first synthesized data by applying the first audio effect 231 to the first decoded data through the first codec, transmitting the first synthesized data to an audio framework, transmitting a first request for deactivating a function of applying the second audio effect 232 to the audio framework 223 in response to the decoding using the first codec, deactivating the function of applying the second audio effect 232 in the audio framework 223 based on the first request, and outputting the first synthesized data through the audio output device 320 without applying the second audio effect 232 to the first synthesized data, in response to the deactivating of the function of applying the second audio effect 232.

According to an embodiment, a computer program stored in a recording medium in association with the electronic device 301 to execute the following operations may be provided, wherein the operations may include acquiring a second user input for interrupting the reproduction of the first audio while outputting the first synthesized data through the audio output device 320, interrupting the decoding of the first audio through the first codec in response to the acquiring of the second user input, transmitting a second request for activating the function of applying the second audio effect 232 to the audio framework 223 in response to the interruption of the decoding using the first codec, and activating the function of applying the second audio effect 232 to be performed in the audio framework 223 in response to the second request.

According to an embodiment, a computer program stored in a recording medium in association with the electronic device 301 to execute the following operations may be provided, wherein the operations may include executing a first application, acquiring a first user input for reproducing a first audio related to the first application, determining whether a codec corresponding to the first audio is a first codec or a second codec in response to the acquiring of the first user input, generating first decoded data by decoding the first audio through the first codec when the codec corresponding to the first audio is the first codec, generating first synthesized data by applying the first audio effect 231 to the first decoded data through the first codec, transmitting the first synthesized data to the audio framework 223, acquiring time information on a first time point corresponding to a time point at which the first audio is decoded through the first codec in response to the decoding using the first codec, transmitting the acquired time information to the audio framework 223, controlling the audio framework 223 to deactivate a function of applying the second audio effect 232 in the audio framework 223 based on a comparison between the first time point and a current time point, and outputting the first synthesized data through the audio output device 320 without applying the second audio effect 232 to the first synthesized data in response to the deactivating of applying the second audio effect 332.

According to an embodiment, a computer program stored in a recording medium in association with the electronic device 301 to execute the following operations may be provided, wherein the operations may include acquiring a second user input for interrupting the reproduction of the first audio while outputting the first synthesized data through the audio output device 320, interrupting the decoding of the first audio through the first codec in response to the acquiring of the second user input, and controlling the audio framework 223 to activate the function of applying the second audio effect 232 to be performed in the audio framework 223 based on a comparison between a second time point corresponding to a time point at which the decoding was last performed and a current time point before the interrupting of the decoding.

Advantageous effects obtainable from the disclosure may not be limited to the above-mentioned effects, and other effects which are not mentioned may be clearly understood, through the following descriptions, by those skilled in the art to which the disclosure pertains.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or described herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described example embodiments of the disclosure, an element included in the disclosure is expressed in the singular or the plural according to example embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although example embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
   an audio output device; and
   a processor configured to be operatively connected to the audio output device, wherein the processor is further configured to:
   execute a first application;
   acquire a first user input for reproducing a first audio related to the first application;
   based on the first user input, generate first decoded data by decoding the first audio using a first codec;
   generate first synthesized data by applying a first audio effect to the first decoded data via the first codec;
   transmit the first synthesized data to an audio framework;
   based on the first audio being decoded using the first codec, transmit, to the audio framework, a first request for deactivating a function of applying a second audio effect;
   deactivate the function of applying the second audio effect in the audio framework based on the first request; and
   output the first synthesized data via the audio output device without applying the second audio effect to the first synthesized data, based on the function of applying the second audio effect being deactivated.

2. The electronic device of claim 1, wherein the processor is further configured to:
   acquire a second user input for interrupting reproduction of the first audio while outputting the first synthesized data via the audio output device;
   based on the second user input, interrupt the decoding of the first audio via the first codec;
   based on interruption of the decoding, transmit, to the audio framework, a second request for activating the function of applying the second audio effect; and
   activate, based on the second request, the function of applying the second audio effect in the audio framework.

3. The electronic device of claim 1, wherein the processor is further configured to:
   generate second decoded data by decoding the first audio using a second codec, which is different from the first codec,
   transmit the second decoded data to the audio framework,
   generate second synthesized data by applying, in the audio framework, the second audio effect to the second decoded data, and
   output the second synthesized data through the audio output device.

4. The electronic device of claim 3, wherein the first codec includes a codec that supports a function of applying the first audio effect, and the second codec includes a codec that does not support the function of applying the first audio effect.

5. The electronic device of claim 1, wherein the processor is further configured to:
   identify a first time point at which the first audio is decoded via the first codec;
   compare, at a predetermined interval, the identified first time point with a current time point;
   determine that the first audio is decoded via the first codec based on a difference between the first time point and the current time point being less than a predetermined value; and
   determine that the first audio is not decoded via the first codec based on the difference between the first time point and the current time point being equal to or greater than the predetermined value.

6. The electronic device of claim 1, wherein the processor is further configured to, in transmitting the first request, transmit identifier information of the first application to the audio framework together with the first request.

7. The electronic device of claim 1, wherein the processor is further configured to, based on the first audio effect being applied to the first decoded data, transmit, to the audio framework, transmission data in which the first synthesized data and data indicating an application of the first audio effect are synthesized.

8. The electronic device of claim 1, wherein the processor is further configured to, based on the first audio effect being applied to the first decoded data, transmit transmission data to the audio framework, the transmission data including the first synthesized data and data indicating an application of the first audio effect.

9. An electronic device comprising:
   an audio output device; and
   a processor configured to be operatively connected to the audio output device, wherein the processor is further configured to:
   execute a first application;
   acquire a first user input for reproducing a first audio related to the first application;
   based on the first user input, generate first decoded data by decoding the first audio via a first codec;
   generate first synthesized data by applying a first audio effect to the first decoded data via the first codec;
   transmit the first synthesized data to an audio framework;
   acquire time information on a first time point at which the first audio is decoded via the first codec;
   transmit the acquired time information to the audio framework;
   control, based on a comparison between the first time point and a current time point, the audio framework to deactivate a function of applying a second audio effect in the audio framework; and
   output the first synthesized data via the audio output device without applying the second audio effect to the first synthesized data, based on the function of applying the second audio effect being deactivated.

10. The electronic device of claim 9, wherein the processor is further configured to:
- acquire a second user input for interrupting reproduction of the first audio while outputting the first synthesized data via the audio output device;
- based on the second user input, interrupt the decoding of the first audio via the first codec; and
- control the audio framework to activate the function of applying the second audio effect, based on a comparison between a second time point at which the decoding was last performed and a current time point before interrupting of the decoding.

11. The electronic device of claim 9, wherein the audio output device includes at least one of a speaker or an earphone.

12. The electronic device of claim 9, wherein the first codec includes a codec that supports a function of applying the first audio effect.

13. The electronic device of claim 9, wherein the processor is further configured to:
- control the audio framework to compare the first time point with the current time point,
- control the audio framework to determine that the first audio is decoded via the first codec, based on a difference between the first time point and the current time point being less than a predetermined value; and
- control the audio framework to determine that the first audio is not decoded via the first codec, based on the difference between the first time point and the current time point being equal to or greater than the predetermined value.

14. The electronic device of claim 9, wherein the processor is further configured to transmit, to the audio framework, identifier information of the first application together with the time information.

15. The electronic device of claim 9, wherein the processor is further configured to, based on the first audio effect being applied to the first decoded data, transmit, to the audio framework, transmission data in which the first synthesized data and data indicating application of the first audio effect are synthesized.

16. The electronic device of claim 9, wherein the processor is further configured to, based on the first audio effect being applied to the first decoded data, transmit, to the audio framework, transmission data including the first synthesized data and data indicating application of the first audio effect.

17. A method of operating an electronic device, the method comprising:
- executing a first application;
- acquiring a first user input for reproducing a first audio related to the first application;
- based on the first user input, generating first decoded data by decoding the first audio via a first codec;
- generating first synthesized data by applying a first audio effect to the first decoded data via the first codec;
- transmitting the first synthesized data to an audio framework;
- transmitting, to the audio framework, a first request for deactivating a function of applying a second audio effect;
- based on the first request, deactivating the function of applying the second audio effect in the audio framework; and
- outputting the first synthesized data via an audio output device without applying the second audio effect to the first synthesized data, based on the function of applying the second audio effect being deactivated.

18. The method of claim 17, further comprising:
- acquiring a second user input for interrupting reproduction of the first audio while outputting the first synthesized data via the audio output device;
- based on the second user input, interrupting the decoding of the first audio via the first codec;
- based on interruption of the decoding, transmitting, to the audio framework, a second request for activating the function of applying the second audio effect; and
- based on the second request, activating the function of applying the second audio effect in the audio framework.

19. A method of operating an electronic device, the method comprising:
- executing a first application;
- acquiring a first user input for reproducing a first audio related to the first application;
- based on the first user input, generating first decoded data by decoding the first audio via a first codec;
- generating first synthesized data by applying a first audio effect to the first decoded data via the first codec;
- transmitting the first synthesized data to an audio framework;
- acquiring time information on a first time point at which the first audio is decoded via the first codec;
- transmitting the acquired time information to the audio framework, and controlling the audio framework to deactivate a function of applying a second audio effect, based on a comparison between the first time point and a current time point; and
- outputting the first synthesized data via an audio output device without applying the second audio effect to the first synthesized data, based on the function of applying the second audio effect being deactivated.

20. The method of claim 19, further comprising:
- acquiring a second user input for interrupting reproduction of the first audio while outputting the first synthesized data via the audio output device;
- based on the second user input, interrupting the decoding of the first audio via the first codec; and
- controlling the audio framework to activate the function of applying the second audio effect, based on a comparison between a second time point at which the decoding was last performed and a current time point before interrupting of the decoding.

* * * * *